Inventor:
JOSEF PFENNINGSBERG

April 18, 1967   J. PFENNINGSBERG   3,314,227
SPINDLE DRIVES FOR SPINNING, TWISTING MACHINES AND THE LIKE
Filed May 6, 1964   2 Sheets-Sheet 2

Inventor:
JOSEF PFENNINGSBERG

United States Patent Office 3,314,227
Patented Apr. 18, 1967

3,314,227
SPINDLE DRIVES FOR SPINNING, TWISTING MACHINES AND THE LIKE
Josef Pfenningsberg, Prinzenstr. 25, Monchen-Gladbach, Germany
Filed May 6, 1964, Ser. No. 365,407
Claims priority, application Germany, May 9, 1963, P 31,767
7 Claims. (Cl. 57—88)

This invention relates to a single spindle drive for spinning, twisting machines and the like.

The known single spindle drives are equipped with a spindle brake which enters into direct engagement with the spindle and brakes the latter. Various methods of reducing wear on the driving means, for example the cord or belt, caused by the running of the spindle drive, have already been attempted. Thus, for example, the spindle has been provided with a loose and a fixed whorl, the driving belt being pushed away from the fixed whorl at the same time as the engagement of the spindle brake. Wear on the driving belt must necessarily occur through the engagement of this shifting member, which with the high speeds of revolution may lead to a rapid destruction of the driving belt. In addition there is the necessity of equipping the spindle additionally with a fixed and a loose whorl, as a result of which the production costs of the spindle are increased.

It is also already known to raise the driving belt from the driving pulley by means of the spindle brake, which is done by engagement of a suitable member acting on the belt. The engagement of this member again necessarily causes considerable wear on the belt.

It is furthermore also known to swingably suspend the tension pulley on a lever, the lever being tilted by the spindle brake against the tensioning direction. As in this known embodiment, a complete removal of the load on the belt is obtained by the tilting of the tension pulley, at the same time the tension pulley is moved out of its working plane and it is necessary to provide side plates on the pulley on both sides, in order to prevent the belt from running off the tension pulley. The driving pulley must also have such side plates in this construction, in order that the belt is held thereon. It hardly needs to be pointed out that, as a result of the side plates the side edges of the belt, when the load on the tension roller is released, rub on the side limiting plates, which again causes rapid wear. With the high speeds of revolution, particularly on the tension pulley, this leads to rapid destruction of the belt.

The present invention avoids these disadvantages. This is achieved according to the invention by the feature that there is arranged on the tension pulley a lever link system under spring pressure which is influenced by the spindle brake in the braking position so that the tensioning pressure acting on the tension roller is reduced to such an extent that the tension pulley is relieved of load whilst practically maintaining its position.

The advantage achieved by the embodiment according to the invention consists in that, through the lever link system, the tension pulley stays practically in its position and its working plane, so that the disadvantages caused by a change in position of the tension pulley cannot occur. Through the lever link system under spring pressure arranged according to the invention, a further advantage is that complete release of load on the tension pulley in the braking is avoided, so that the driving belt through the tension pulley remaining in its position and the slight residual load acting thereon itself cannot undergo any change in position. Thus, the running off of the belt from the tension pulley when the load on the latter is partly released is reliably prevented. This eliminates the causes of wear and operational disturbances which have always been present in the known constructions. The partial release of load on the tension pulley is brought about by the spring pressure being removed from the spindle brake in the braking position, so that the tension pulley is no longer under the action of the tension spring.

The lever link system consists of levers being in positive engagement in the extended position, and which transmit to the tension pulley the force of a spring acting on the lever remote from the tension pulley. When the levers are moved into the bent position under the action of the spindle brake, the pressure of the springs is released. The lever link system consists of a two-part articulated lever, wherein in the extended position the two levers act as a single rigid lever so that the spring force is fully transmitted through the levers in the extended position to the tension pulley. In the braking position, the articulated lever is brought into the bent position under the action of the spindle brake, at the same time the pressure of the springs is removed from the spindle brake. The tension pulley is thus in the braking position merely under the action of its own weight and thus undergoes sufficient release of load. At the same time, through the articulated lever, the tension pulley is held practically in the same position and in the working plane.

In one embodiment of the lever link system, it consists of two levers pivotable about a fixed fulcrum, one of which acts as a tension pulley carrier and the other is under the action of a compression spring and can be acted upon at its end by the spindle brake in a direction opposed to the spring action.

In another embodiment the lever link system consists of two levers connected with one another in an articulated manner and in positive engagement in the extended position, the lever acted on by the brake being pivotable as a toggle lever about a fixed fulcrum.

In a further embodiment of the invention a spring acting additionally in the tensioning direction may be arranged on the lever acting as tensioning pulley carrier, through which spring the pressure acting in the released position on the tension pulley and produced by its own weight can be reinforced.

In order to keep the tension pulley mathematically exactly in the same plane in the stressed and unstressed state, in a further embodiment of the invention, the lever acting as tension pulley carrier is engaged at its free end in a plate which carries the tension pulley and is guided in a longitudinally displaceable manner parallel with the direction of travel of the belt.

In order to ensure reliable operation of the embodiment according to the invention, the spindle brake is so designed that it enters into engagement with the lever link system before the braking of the spindle. This means that on entering of the spindle brake into the braking position, release of load on the tension pulley is first effective, whereupon braking of the spindle is produced. On release of the braking position in reverse sequence first the braking of the spindle is removed and directly afterwards the tension pulley is put under full tensioning pressure. This prevents the driving belt from rotating under full tensioning pressure whilst the spindle is braked.

The advantageous feature present in all the aforementioned embodiments consists in an extensive partial release of load on the tension pulley on breaking of the spindle, the tension pulley remaining practically in its position and in its plane, so that the driving belt is in practice not subjected to any excessive wear through the stopping of the spindle. The embodiment according to the invention wherein the tension pulley is accommodated in a plate longitudinally displaceable parallel with the tensioning plane, has the further advantage that slight alterations in length of the belt, which may occur after lengthy operation, are compensated without the tension pulley being moved out of its tensioning plane, so that disturbance of function because of such alterations in length is avoided.

The accompanying drawings show some embodiments of the invention by way of example. In the drawings.

Figure 1:
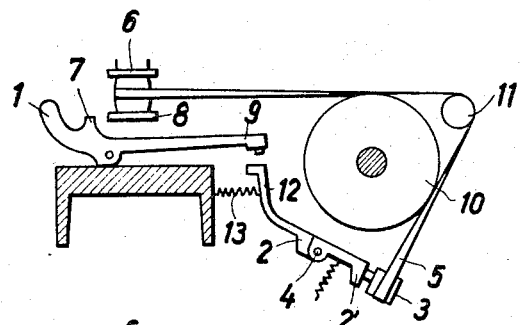
FIGURE 1 is a diagrammatic view of a single spindle drive in side view in the unbraked position.
Figure 2:
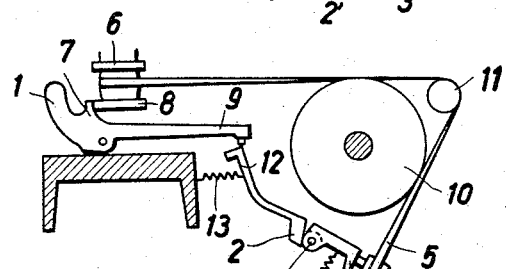
FIGURE 2 is a view according to FIGURE 1 in the braked position.

FIGURES 1 and 2 show the whorl of a conventional spindle 6. A spindle brake 1 acts with its projection 7 on the braking disc 8 of the wall, and the brake 1 has an arm 9. The belt 5 is guided over the whorl 6, the driving pulley 10, the tension pulley 3 and a guide pulley 11. The tension pulley 3 is arranged at the end of the lever 2', which forms with the lever 2 an articulated lever which in the extended position shown in FIGURE 1 acts as a single lever. At the front end 12 of the lever 2 is arranged a compression spring 13, which urges the lever 12 about the fixed fulcrum 4 in the direction of the driving pulley 10. The lever 2' is entrained by the lever 2 and urges the tension pulley 3 in the tensioning direction, so that the tensioning force of the tensioning pulley 3 corresponds to the force of the spring 13. As FIGURE 2 shows, on braking, the arm 9 enters into engagement with the front end 12 of the lever 2 and urges the lever 2 against the action of the spring 13. Thereby the lever 2 is guided into the bent position relatively to the lever 2', so that the positive connection between the levers 2 and 2' is removed, the force of the spring 13 being taken up by the arm 9 of the spindle brake 1. The tension pulley 3 is now only under the action of its own weight and the weight of the lever 2', which is suspended on the fixed fulcrum 4. The tension pulley 3 is thus relieved of the tensioning force of the spring 13. On the lever 2' there may be provided an additional tension spring 16, which likewise acts in the tensioning direction, and the action of which is maintained even when the lever 2–2' is bent. The additional arrangement of such a spring 16 acts when the pressure in the released state caused by the weight of the pulley 3 is not sufficient.

Figure 3:
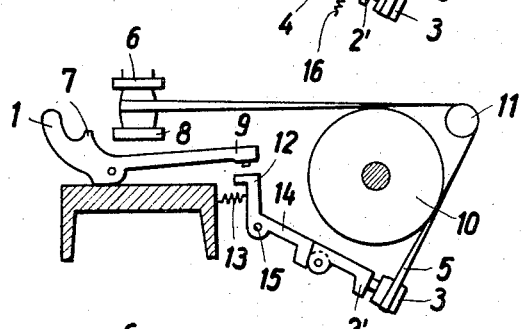
FIGURE 3 is a diagrammatic view of a modified embodiment of the spindle drive in the unbraked position.
Figure 4:
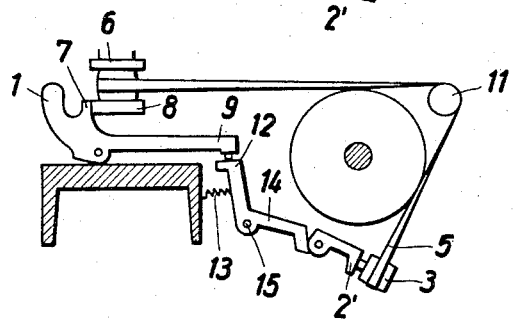
FIGURE 4 is a view according to FIGURE 3 in the braked position.

In FIGURES 3 and 4 a modified embodiment is shown, which differs from that shown in FIGURES 1 and 2, in that the lever 2 of FIGURES 1 and 2 is designed as a double-armed lever 14 which is pivotable about a fixed fulcrum 15.

Figure 5:
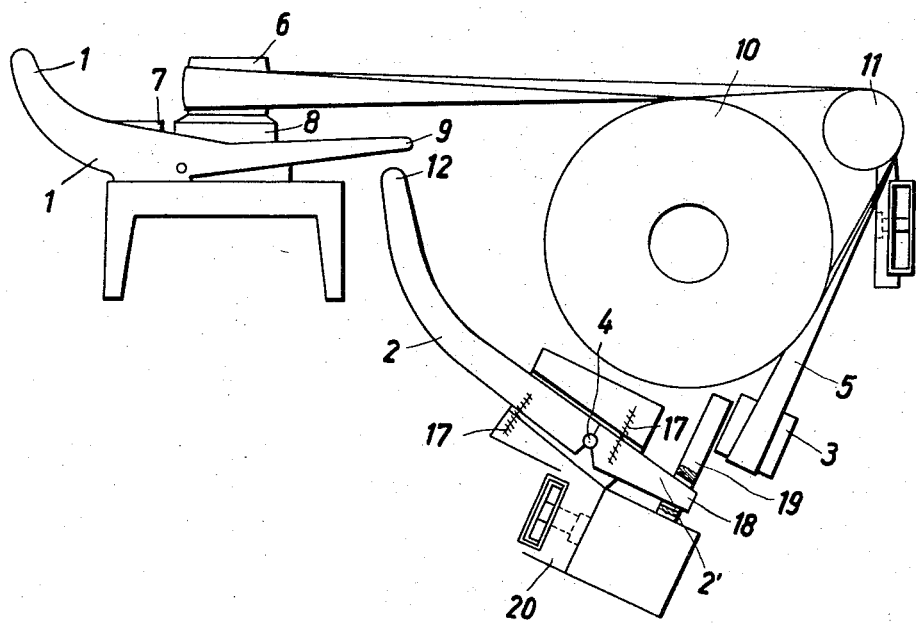
FIGURE 5 is a diagrammatic view of a further modified embodiment in the unbraked position.

FIGURE 5 shows a further embodiment. The levers 2 and 2' form a pair of articulated levers as shown in FIGURE 1. The lever 2 is under the action of the compression spring 17. The front end 18 of the lever 2' engages in a plate 19, which takes the tension roller 3 at its front end. The plate 19 is arranged in a guide 20 in a longitudinally displaceable manner parallel with the direction of travel of the belt 5, so that any slight alteration in length occurring in the belt 5 can be compensated.

I claim:

1. In a spindle drive, the combination comprising a rotatably mounted spindle, a rotatably and displaceably mounted tension pulley, belt-type drive means operatively interconnected between said spindle and said tension pulley, a brake movable into braking position with respect to said spindle for stopping the rotation of the latter, a lever link system operatively connected to said tension pulley for displacing the latter and being operatively engaged with said brake when the latter is in said braking position, resilient means operatively connected to said lever link system for displaceably urging said tension pulley into a belt-tensioned position, and means operatively interconnected between said brake and said lever link system for relieving the tension on said belt-type drive means by countering the urging by said resilient means on said tension pulley when said brake is moved into braking position with respect to said spindle.

2. A spindle drive as claimed in claim 1, further including said lever link system being comprised of levers arranged to be a single rigid system in the extended position and a flexible system in the bent position, and said resilient means being a spring disposed to act on said system for yieldably maintaining said system rigid for effecting a tensioning force to said tension pulley, and said spring being disposed to be countered for moving said system into the bent position under the action of the spindle brake.

3. A spindle drive as claimed in claim 2, further including said lever link system being comprised of two levers pivotable about a common fixed fulcrum, one of said levers being adapted and connected to said tension pulley for displaceably supporting the latter and the other of said levers being responsive to the action of said resilient means and said brake.

4. A spindle drive as claimed in claim 1, further including said lever link system being comprised of two levers connected with one another about a common fulcrum and in an articulated manner and in rigid relation in the extended position, one of said levers being disposed to be acted on by said brake and being pivotable out of said rigid relation and with said levers being arranged as a toggle lever about said fixed fulcrum, and the other of said levers being connected to said tension pulley.

5. A spindle drive as claimed in claim 4, further including a spring acting on said other lever in the belt tensioning direction.

6. A spindle drive as claimed in claim 1, further including a plate for displaceably supporting said tension pulley and being movable parallel with the direction of travel of said belt-type drive leading into said tension pulley.

7. A spindle drive as claimed in claim 1, further arranged with said means being operative to relieve the tension on said belt-type drive prior to said brake being movable into braking position with said spindle.

References Cited by the Examiner

FOREIGN PATENTS 911,324   11/1962   Great Britain.

FRANK J. COHEN, *Primary Examiner.*

J. PETRAKES, *Assistant Examiner.*